US010250090B2

(12) United States Patent
Li et al.

(10) Patent No.: US 10,250,090 B2
(45) Date of Patent: Apr. 2, 2019

(54) ROTOR, MOTOR, PUMP AND CLEANING APPARATUS

(71) Applicant: JOHNSON ELECTRIC INTERNATIONAL AG, Murten (CH)

(72) Inventors: Min Li, Hong Kong (CN); Moola Mallikarjuna Reddy, Hong Kong (CN); Xiao Lin Zhang, Hong Kong (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 479 days.

(21) Appl. No.: 14/965,426

(22) Filed: Dec. 10, 2015

(65) Prior Publication Data

US 2016/0172914 A1 Jun. 16, 2016

(30) Foreign Application Priority Data

Dec. 11, 2014 (CN) .......................... 2014 1 0765091
Jun. 12, 2015 (CN) .......................... 2015 1 0323877

(51) Int. Cl.
*F04D 25/06* (2006.01)
*H02K 1/27* (2006.01)
(Continued)

(52) U.S. Cl.
CPC ............. *H02K 1/278* (2013.01); *F04D 13/06* (2013.01); *F04D 17/10* (2013.01); *F04D 25/06* (2013.01);
(Continued)

(58) Field of Classification Search
CPC ...... H02K 21/18; H02K 21/185; H02K 1/141; H02K 1/143; F04D 25/064
See application file for complete search history.

(56) References Cited

U.S. PATENT DOCUMENTS 1,979,813 A * 11/1934 Reis ...................... H02K 1/2706
310/156.63
4,750,872 A * 6/1988 Palliser ................. F04D 13/021
416/244 R
(Continued)

FOREIGN PATENT DOCUMENTS

CN 2705636 Y 6/2005
EP 0 633 648 A1 1/1995
(Continued)

OTHER PUBLICATIONS

Yin-Kwang Lin, et al., "Back electromotive force enhancement for a new single-phase synchronous motor", Journal of Applied Physics, vol. 85, No. 8, Apr. 15, 1999, pp. 4907-4909.
(Continued)

*Primary Examiner* — Charles Freay
*Assistant Examiner* — Thomas Fink
(74) *Attorney, Agent, or Firm* — Muncy, Geissler, Olds & Lowe, P.C.

(57) ABSTRACT

A rotor, motor, pump and a cleaning apparatus are provided. The rotor includes a shaft and two magnets fixed to the rotary shaft. Each magnet comprises a radial outer surface, a radial inner surface, and two connecting surfaces that connect the radial outer surface and the radial inner surface at opposite ends of the magnet. The radial outer surface has an arc section. The radial inner surfaces of the two magnets cooperatively define an inner bore for the shaft to pass therethrough. A ratio of a pole arc angle of each magnet to a 180-degree angle is in the range of 0.75 to 0.95.

16 Claims, 8 Drawing Sheets

(51) Int. Cl.
 *F04D 13/06*    (2006.01)
 *H02K 1/14*    (2006.01)
 *F04D 17/10*    (2006.01)
 *H02K 1/28*    (2006.01)
 *H02K 21/18*    (2006.01)
 *H02K 29/03*    (2006.01)
 *H02K 7/14*    (2006.01)
 *H02K 11/33*    (2016.01)

(52) U.S. Cl.
 CPC .............. *H02K 1/143* (2013.01); *H02K 1/28* (2013.01); *H02K 21/185* (2013.01); *H02K 7/14* (2013.01); *H02K 11/33* (2016.01); *H02K 29/03* (2013.01); *H02K 2213/03* (2013.01)

(56) References Cited

U.S. PATENT DOCUMENTS

| | | | | |
|---|---|---|---|---|
| 4,777,394 | A * | 10/1988 | Hayashi | H02K 7/10 310/156.08 |
| 5,170,084 | A * | 12/1992 | Fujita | H02K 23/04 29/607 |
| 5,175,461 | A * | 12/1992 | Zigler | H01F 41/0253 310/156.28 |
| 5,627,423 | A * | 5/1997 | Marioni | H02K 1/278 310/156.23 |
| 5,675,226 | A * | 10/1997 | Riola' | H02K 29/03 318/400.26 |
| 5,912,521 | A * | 6/1999 | Ray | H02P 6/16 310/156.06 |
| 2002/0175572 | A1 * | 11/2002 | Cho | H02K 1/143 310/216.001 |
| 2003/0098660 | A1 * | 5/2003 | Erdman | F25D 29/00 318/400.22 |
| 2004/0164638 | A1 * | 8/2004 | Asaba | H02K 3/47 310/208 |
| 2004/0239200 | A1 * | 12/2004 | Strahan | H02K 21/185 310/162 |
| 2006/0192454 | A1 * | 8/2006 | Yamada | H02K 23/04 310/154.22 |
| 2006/0226715 | A1 * | 10/2006 | Lee | H02K 29/03 310/156.46 |
| 2007/0052318 | A1 * | 3/2007 | Marioni | H02K 1/143 310/216.037 |
| 2007/0145851 | A1 | 6/2007 | Kikuchi et al. | |
| 2009/0021094 | A1 * | 1/2009 | Takimoto | H02K 1/278 310/156.12 |
| 2009/0226335 | A1 * | 9/2009 | Lee | H01F 30/06 417/423.3 |
| 2012/0164009 | A1 * | 6/2012 | Sakata | F04C 2/084 417/410.4 |
| 2014/0132110 | A1 * | 5/2014 | Burton | H02K 1/18 310/216.131 |

FOREIGN PATENT DOCUMENTS

| | | |
|---|---|---|
| EP | 1 139 548 A2 | 10/2001 |
| EP | 1 261 101 A2 | 11/2002 |
| EP | 2 731 233 A2 | 5/2014 |
| GB | 2 181 307 A | 4/1987 |

OTHER PUBLICATIONS

Search Report dated Jun. 15, 2016 in corresponding European Patent Application No. 15198530.6.

* cited by examiner

ROTOR, MOTOR, PUMP AND CLEANING APPARATUS

CROSS REFERENCE TO RELATED APPLICATIONS

This non-provisional patent application claims priorities under 35 U.S.C. § 119(a) from Patent Application No. 201410765091.8 filed in The People's Republic of China on 11 Dec. 2014 and Patent Application No. 201510323877.9 filed in The People's Republic of China on 12 Jun. 2015.

FIELD OF THE INVENTION

This invention relates to motors and in particular, to a permanent magnetic rotor for a motor.

BACKGROUND OF THE INVENTION

Permanent magnetic rotors usually include a rotary shaft and permanent magnets fixed to the rotary shaft. The permanent magnet may be an annular magnet having a plurality of magnetic poles arranged in a circumferential direction. The permanent magnet may also include a plurality of separate arc magnets. The annular magnet usually has a high cost. For some applications such as the drain pump for dishwashers, the motor is usually required to produce low vibration.

SUMMARY OF THE INVENTION

Thus, there is a desire for a low cost permanent magnetic rotor having low cost and producing low vibration.

In one aspect, a synchronous motor is provided. The motor includes a stator and a permanent magnetic rotor rotatable relative to the stator. The rotor comprises a rotary shaft and two magnets fixed to the rotary shaft. Each magnet comprises a racial outer surface, a radial inner surface, and two connecting surfaces that connect the radial outer surface and the radial inner surface at opposite ends of the magnet. The radial outer surface has an arc section. The radial inner surfaces of the two magnets cooperatively define an inner bore for the rotary shaft to pass therethrough. The stator comprises a stator core and stator windings wound around the stator core. When the stator windings are connected in series to an alternating current power supply, the rotor rotates at a constant speed of 60 f/p RPM during a steady state, where f is the frequency of the alternating current power supply, and p is the number of pole pairs of the permanent magnetic rotor. The stator core comprises a pair of opposing poles and a yoke connected between the poles. Each pole has a pole arc surface facing the rotor, with an air gap formed between the pole arc surface and the rotor. A ratio of a pole arc angle of each magnet to a 180-degree angle is in the range of 0.75 to 0.94.

Preferably, the pair of poles comprises opposing circumferential end portions spaced apart from each other.

Preferably, a ratio of a distance between the circumferential end portions to a minimum width of the air gap is less than 2.

Preferably, the pole arc surface is concentric with the rotor such that a uniform main air gap is formed between the pole arc surface and the rotor; an inward-recessed startup groove is formed in the pole arc surface, and the startup groove and the rotor form a non-uniform air gap therebetween.

Preferably, the two permanent magnets are fixed to the rotary shaft by an over-molding piece, an outer surface of the over-molding piece is concentric with the rotary shaft, the two connecting surfaces of each magnet are coplanar, and a ratio of a distance between two outer ends of the two connecting surfaces to a diameter of the outer surface of the over-molding piece is in the range of 0.82 to 0.95.

Preferably, the radial outer surface of each magnet further includes two plane sections extending respectively from two circumferential ends of the arc section to the connecting surfaces, two plane sections of the radial outer surfaces of the two magnets at one same side are coplanar, and a distance between two circumferential ends of these two coplanar plane sections is in the range of 2 mm to 9.5 mm.

In another aspect, a rotor is provided which comprises a rotary shaft and two magnets fixed to the rotary shaft. Each magnet comprises a radial outer surface, a radial inner surface, and two connecting surfaces that connect the radial outer surface and the radial inner surface at opposite ends of the magnet. The radial outer surface has an arc section. The radial inner surfaces of the two magnets cooperatively define an inner bore for the rotary shaft to pass therethrough. A ratio of a pole arc angle of each magnet to a 180-degree angle is in the range of 0.75 to 0.94.

Preferably, a ratio of a pole arc angle of each magnet to a 180-degree angle is in the range of 0.9 to 0.94.

Preferably, the two permanent magnets are fixed to the rotary shaft by an over-molding piece, an outer surface of the over-molding piece is concentric with the rotary shaft, the two connecting surfaces of each magnet are coplanar, and a ratio of a distance between two outer ends of the two connecting surfaces to a diameter of the outer surface of the over-molding piece is in the range of 0.82 to 0.95.

Preferably, the radial outer surface of each magnet further includes two plane sections extending respectively from two circumferential ends of the arc section to the connecting surfaces, two plane sections of the radial outer surfaces of the two magnets at one same side are coplanar, and a distance between two circumferential ends of these two plane sections is in the range of 2 mm to 9.5 mm.

Preferably, the distance between the two circumferential ends of these two plane sections is in the range of 2 mm to 2.5 mm.

Preferably, the two permanent magnets are fixed to the rotary shaft by an over-molding piece, the radial outer surface of each magnet further includes two plane sections extending respectively from two circumferential ends of the arc section to the connecting surfaces, two plane sections of the radial outer surfaces of the two magnets at one same side are coplanar, the over-molding piece defines a positioning groove at an area where the two magnets contact with each other, with the two plane sections at the same side of the two magnets completely exposed.

In another aspect, a motor is provided which includes a stator and a rotor as described above.

In another, a pump is provided. The pump includes a pump housing having a pump chamber, an inlet and an outlet in communication with the pump chamber, an impeller rotatably disposed in the pump chamber, and a motor for driving the impeller. The motor comprises a stator and a rotor as described above.

In still another aspect, a cleaning apparatus is provided. The cleaning apparatus includes a cleaning chamber, a water supply passage for supplying cleaning water to the cleaning chamber, a drain passage for drainage of water, and a drain pump for pumping the cleaning water in the cleaning chamber to the drain passage. The drain pump comprises the features of the pump as described above.

In comparison with the conventional arc magnets, the pole arc angle of the magnet of the rotor of the present embodiment is increased, which can reduce the cogging torque of the motor, thus making the rotation of the rotor smoother. In comparison with the annular magnet, the cost of the magnet of the present embodiment is reduced.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
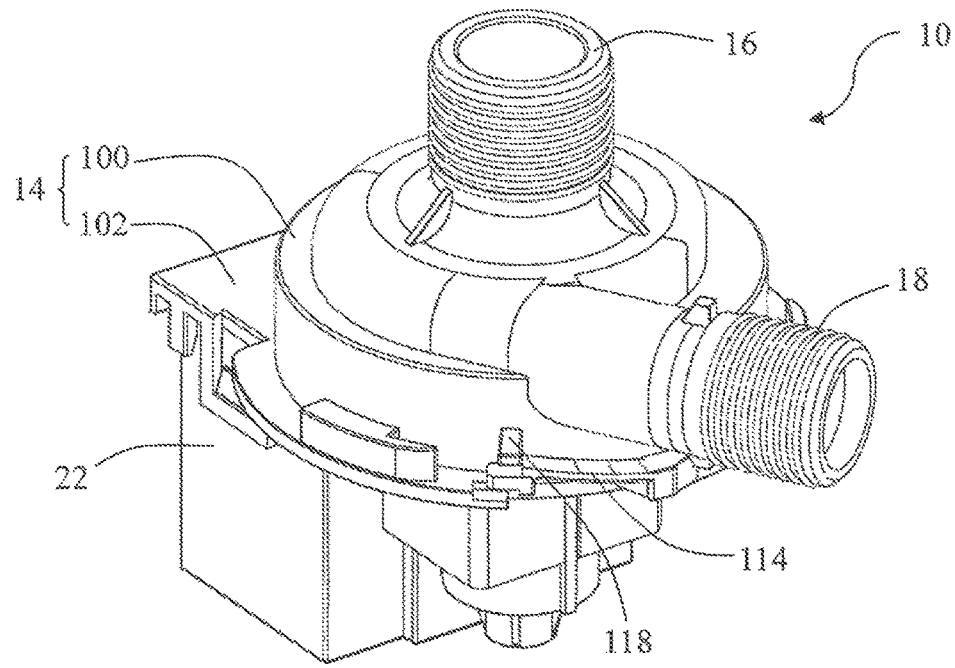
FIG. 1 illustrates a pump according to one embodiment of the present invention.
Figure 2:
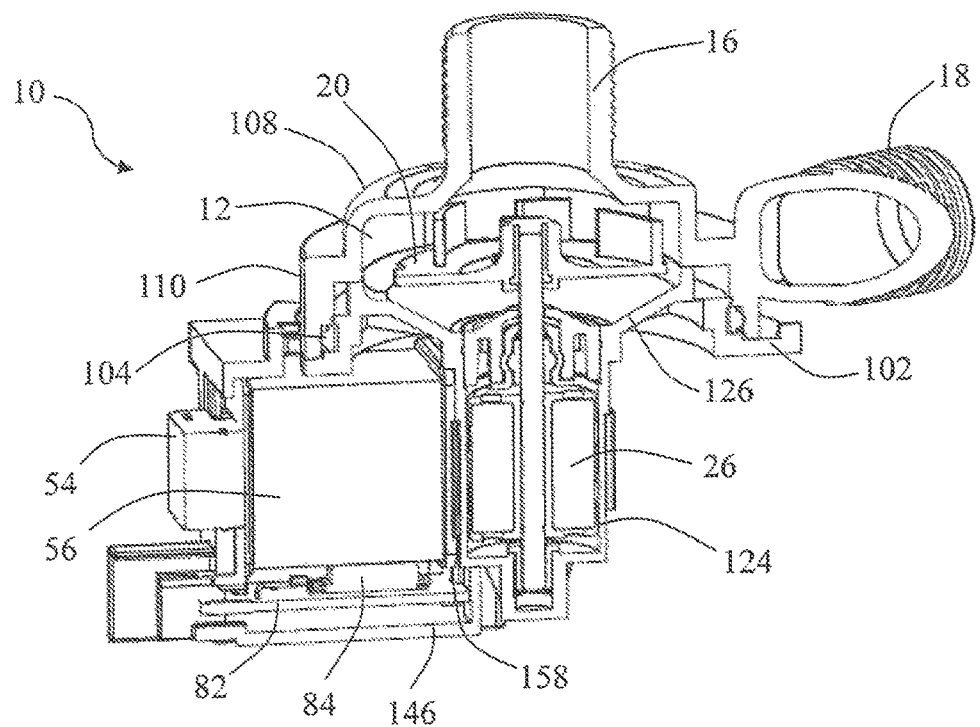
FIG. 2 is an axial cross-sectional view of the pump of FIG. 1.

Referring to FIG. 1 and FIG. 2, a pump 10 according to one embodiment of the present invention includes a pump housing 14 having a pump chamber 12, an inlet 16 and an outlet 18 in fluid communication with the pump chamber 12, an impeller 20 rotatably disposed in the pump chamber 12, and a motor 22 for driving the impeller 20. Preferably, the motor 22 is a synchronous motor including a stator and a rotor 26 rotatable relative to the stator. The pump described herein is particularly suitable for use in cleaning apparatus such as dish washers or laundry machines.

Figure 3:
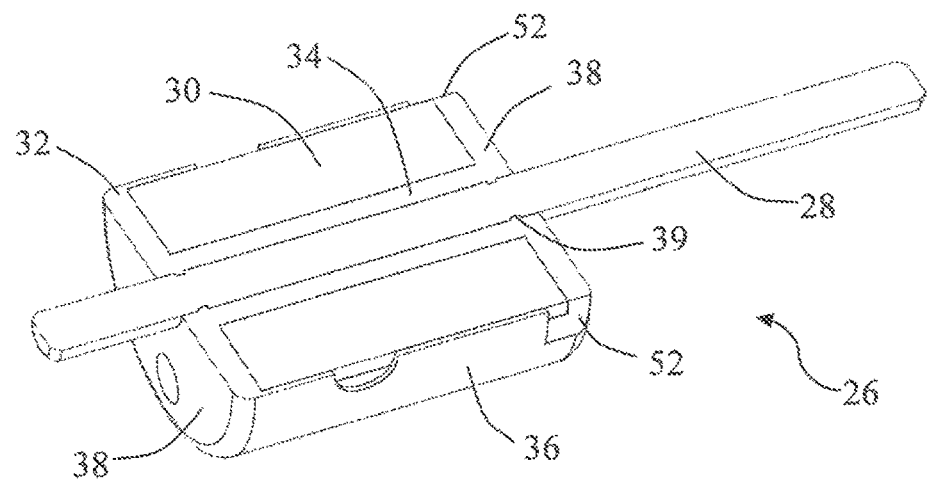
FIG. 3 is an axial cross-sectional view of a motor rotor of the pump of FIG. 1.
Figure 4:
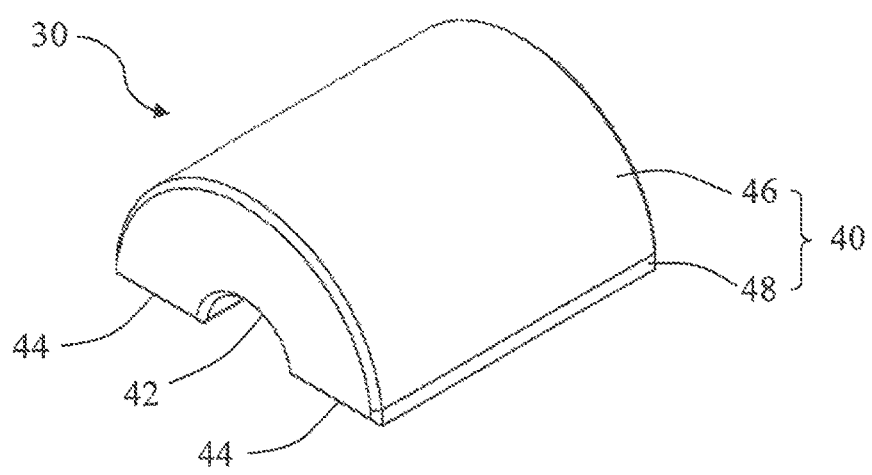
FIG. 4 illustrates a magnet of the rotor of FIG. 3.
Figure 5:
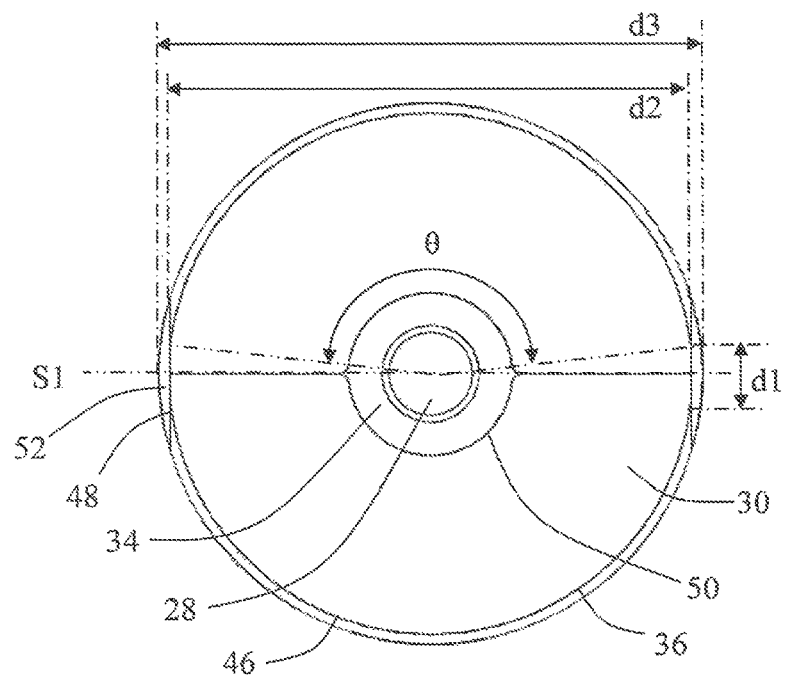
FIG. 5 is a radial cross-sectional view of the motor rotor of FIG. 3.

Referring to FIG. 3 through FIG. 5, the rotor 26 includes a rotary shaft 28 and magnets 30 fixed to the rotary shaft 28. In the illustrated embodiment, the rotor 26 includes two permanent magnets 30 forming two poles with opposite polarities. The permanent magnets 30 are fixed to the rotary shaft 28 by an over-molding piece 32. The over-molding piece 32 includes an inner ring 34, an outer ring 36, and two end plates 38 disposed to interconnect opposite axial ends of the inner and outer rings 34, 36. The outer ring 36 is over-molded on the magnets 30 and has an outer surface concentric with the rotary shaft 28. The inner ring 34 is over-molded on the rotary shaft 28. The two magnets 30 are fixed radially between the inner ring 34 and the outer ring 36 and fixed axially between the two end plates 38. A concave-convex structure 39 is formed on an outer surface of the rotary shaft 28 to strengthen the bonding force between the over-molding piece 32 and the rotary shaft 28. Each magnet 30 covers a half of the circumference along the circumferential direction, including a radial outer surface 40, a radial inner surface 42, and two connecting surfaces 44 that connect the radial outer surface 40 and the radial inner surface 42 at opposite ends of the magnet 30. Preferably, the two connecting surfaces 44 are plane surfaces and coplanar. The radial outer surface 40 includes an arc section 46 and two plane sections 48 extending from opposite circumferential ends of the arc portion 46 to the connecting surfaces 1/1. The magnets 30 may be sintered from powder material. The plane sections 48 may be used to position the formed magnet 30 for subsequent processing such as grinding. The arc section 46 of the outer surface 40 may be concentric with the radial inner surface 42. The radial inner surfaces 42 of the two magnets 30 cooperatively define an inner bore 50 for the rotary shaft 28 to pass therethrough. The inner ring 34 of the over-molding piece 32 is formed between the radial inner surface 42 and the rotary shaft 28.

Preferably, a ratio of a pole arc angle θ of each magnet 30 to the angle of 180 degrees is in the range of 0.75 to 0.94, and more preferably in the range of 0.9 to 0.94. The term "pole arc angle" as used herein refers to the angle formed by hypothetical lines connecting the two circumferential ends of the arc section 46 of the radial outer surface 40 and a center axis of the rotary shaft 28. The two plane surface sections 48 of the radial outer surfaces 40 of the two magnets 30 at one same side are coplanar. A distance d1 between two circumferential ends of the two coplanar plane surface sections 48 is in the range of 2 mm to 9.5 mm. A ratio of a distance d2 between two outer ends of the two coplanar connecting surfaces 44 to a diameter d3 of the outer surface of the over-molding piece 32 is in the range of 0.82 to 0.95. In one embodiment, the pole arc angle θ of the magnet 30 is greater than 166 degrees, and the distance d1 between the two circumferential ends of the two coplanar plane surface sections 48 is in the range of 2 mm to 2.5 mm. The axial end of the outer ring 36 of the over-molding piece 32 defines at least two positioning grooves 52 spacedly disposed in the circumferential direction, for positioning the two magnets 30 during the process of forming the over-molding piece 32. Each positioning groove 52 is disposed at an area where the two magnets 30 contact with each other, with the two plane surface sections 48 at the same side of the two magnets 30 completely exposed.

In comparison with the conventional arc magnet, the pole arc angle of the magnet of the rotor in the present embodiment is increased, which reduces the cogging torque of the motor, making rotation of the rotor smoother. In comparison with the ring-shaped magnet, the arc magnet of the present embodiment reduces the cost.

Figure 6:
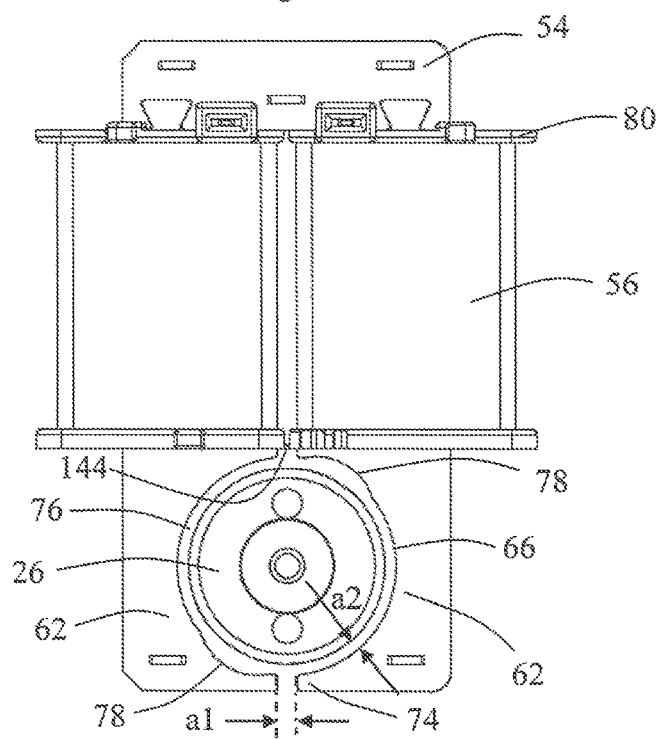
FIG. 6 is a partial, plane view of a motor of the pump of FIG. 1.
Figure 7:
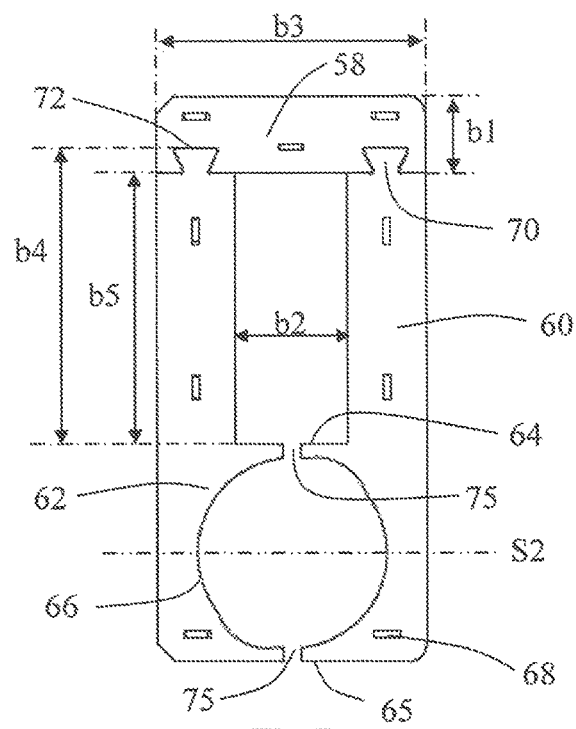
FIG. 7 is a plane view of a stator core of the motor of FIG. 6.

Referring to FIG. 6 and FIG. 7, the stator includes a stator core 54 and stator windings 56 wound around the stator core 54. In the present embodiment, the stator core 54 includes a bottom 58, two branches 60 extending from opposite ends of the bottom 58, and a pair of opposing poles 62 formed on the two branches 60. Preferably, the bottom 58 is bar-shaped, the two branches 60 extend in parallel from opposite ends of the bottom 58, and the two poles 62 are formed on the two branches 60 at ends thereof away from the bottom 58. Each pole 62 includes two side surfaces 64, 65 extending from the corresponding branch 60 and substantially parallel to the bottom 58 and a recessed pole arc surface 66 between the two side surfaces 64 and 65. The outer surface of the rotor faces the pole arc surface 66, with an air gap formed therebetween.

Preferably, the bottom 58 and the two branches 60 may be separately formed. The bottom 58 may be formed by a stack of multiple plate-shaped bottom members, and the branch 60 may be formed by a stack of multiple plate-shaped branch members. Each of the bottom members and branch members defines an assembly hole 68 for mounting the stacked plate-shaped member together. A protrusion 70 projects from an end surface of an end of each branch 60 adjacent the bottom 58, and the opposite ends of the bottom 58 correspondingly form two recessed portions 72. After the bottom members and branch members are assembled to form their respective lamination structures, the protrusions 70 of the two branches 60 are snappingly connected with the two recessed portions 72 of the bottom 58 to form the stator core. Alternatively, the protrusion 70 may be formed on the bottom 58 and the recessed portion 72 may be formed in the branch 60. In the present embodiment, a maximum width b1 of the bottom 58 is not greater than a minimum distance b2 between the two branches 60 after they are spliced together. A maximum length b3 of the bottom 58 is not greater than a maximum distance b4 between the side surface 64 of the branch 60 facing the bottom and the farthest point of the end of the branch 60 adjacent the bottom (the distal end of the protrusion 70 in the present embodiment). In the stator core as constructed above, the bottom 58 may be formed by the material between the two branches 60 that was removed during the process of forming the branches 60, thus saving the material and hence reducing the cost. In addition, the maximum length b3 of the bottom 58 may be greater than a distance b5 between the side surface 64 of the branch 60 facing the bottom 58 and the end surface of the end of the branch 60 adjacent the bottom 58.

The two stator poles 62 form opposing circumferential end portions 74 at each of two circumferential ends of the stator poles. An open slot 75 is defined between the opposing circumferential end portions, which forms a large magnetic resistance and reduces magnetic leakage. The pole arc surfaces 66 of the stator poles 62 and the outer surface of the rotor 26 form a substantially uniform air gap therebetween. The phraseology "substantially uniform air gap" refers to the situation where a uniform air gap is formed between most part of the stators and most part of the rotor, and only a few part of the air gap is non-uniform. Preferably, the pole arc surfaces 66 of the stator poles are concentric with the rotor thus forming a uniform main air gap 76. Each pole arc surface 66 forms an inward-recessed startup groove 78, such that a non-uniform air gap is formed between the startup groove 78 and the outer surface of the rotor 26. Preferably, the two startup grooves 78 of the pole arc surfaces of the two poles 62 are symmetrical with respect to a diameter of the rotor and each extend from a corresponding one of the circumferential end portions 74. This configuration can ensure that a pole axis S1 (FIG. 5) of the rotor 26 deviates an angle from a center axis S2 of the stator pole 62 when the rotor 26 is stationary, such that the rotor has a fixed starting direction each time the motor is powered on. The pole axis refers to the boundary between two different magnetic poles (the two magnets in this present embodiment), and the center axis of the stator pole refers to a line passing centers of the two poles 62.

Preferably, a ratio of a distance al between the two opposed circumferential end portions 74 of the two stator poles to a minimum air gap (the main air gap between the pole arc surface and the rotor in the present embodiment) between the pole arc surface of and the rotor is less than 2.

In the present embodiment, the two open slots 75 have the same and uniform width and are parallel to the length direction of the branches 60. Alternatively, each open slot 75 may have a non-uniform width. In this case, the distance al between the two opposed circumferential end portions 74 as described above refers to the minimum width of the open slot 75.

The motor configuration of the present embodiment can ensure that the rotor has the fixed starting direction and, at the same time, reduce the cogging torque of the motor thus making the rotation of the rotor smoother.

Figure 8:
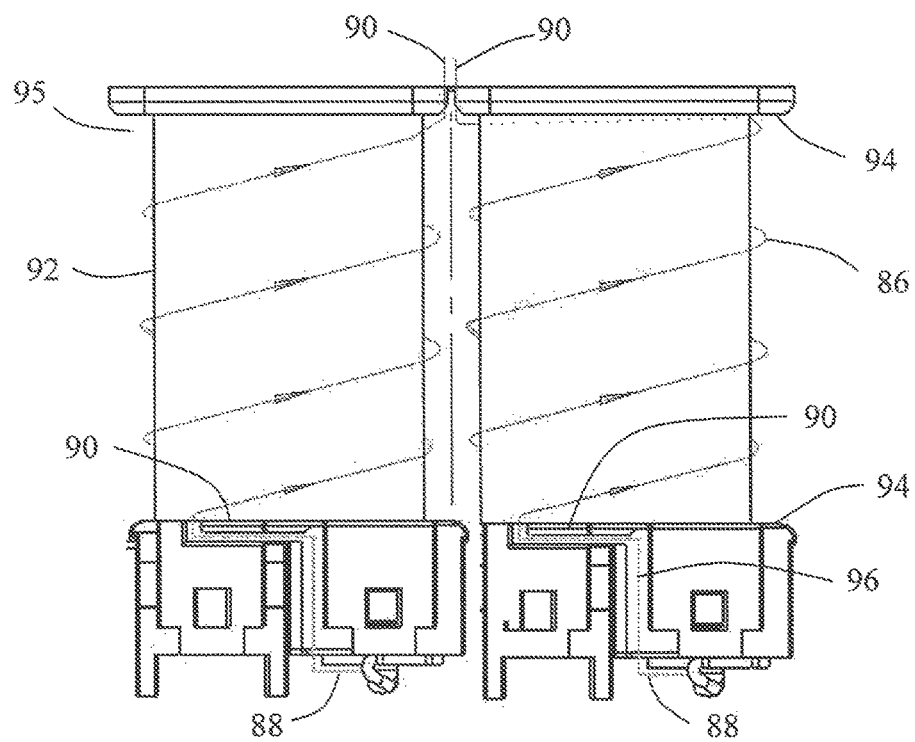
FIG. 8 illustrates another embodiment of insulating winding brackets of the stator of the motor of FIG. 6.
Figure 9:
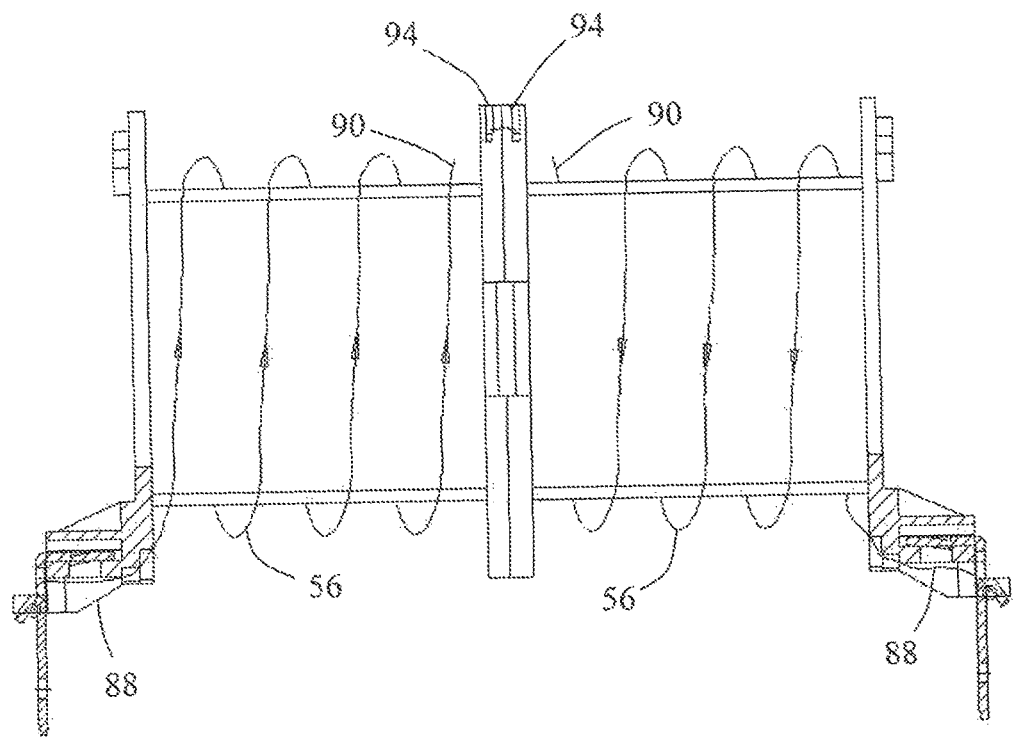
FIG. 9 is a view showing the insulating winding brackets of the stator of the motor of FIG. 6 are arranged end to end in the horizontal direction.

Referring to FIG. 8 and FIG. 9, preferably, the stator includes a pair of stator windings 56 respectively wound around insulating winding brackets 80 of the two branches 60 of the stator core 54. The motor further includes a circuit board 82 (FIG. 2) mounted to the insulating winding brackets 80 in a direction parallel to the branches 60. An overheat protector 84 is mounted to the circuit board 82. The overheat protector 84 is disposed between the circuit board 82 and the two stator windings 56 and can cut off the power supply in case the temperature of either of the windings 56 is over high. The two stator windings 56 may be formed by winding two separate conductor wires 86 which are then electrically connected to each other. Each conductor wire 86 has an incoming terminal 88 and an outgoing terminal 90. The two windings may be formed by winding the two conductor wires 86 at the same time, which is time saving. The two incoming terminals 88 of the two stator windings 56 are located at lengthwise ends of the parallel branches 60 and are disposed at inner layers of the windings. The two outgoing terminals 90 are located at the other lengthwise ends of the parallel branches 60 and are disposed at outer layers of the windings. The insulating winding bracket 88 includes a tubular portion 92 and end walls 94 extending outwardly from opposite ends of the tubular portion 92. A winding space 95 is formed between a radial outer surface of the tubular portion 92 and axially opposing surfaces of the two end walls 94 for receiving the windings 56.

The end walls 94 of the two insulating winding brackets 80 at the side where the incoming terminals 88 are disposed each form a wire guiding slot 96. The two incoming terminals 96 of the two stator windings 56 are routed from an outside of the winding brackets 80 through the wire guiding slots 96 to the winding spaces 95 at the inside of the winding brackets 80. An isolating wall 98 is formed between the wire guiding slot 96 and the winding space 95 at the inside of the winding bracket. The isolating wall 98 extends to the outer surface of the tubular portion 92. The incoming terminal 88 is blocked by the isolating wall 98 and does not enter the winding space until reaching the outer surface of the tubular portion 92. Therefore, the incoming terminal 88 is isolated from each layer of coil in the winding space 95, thus avoiding short-circuit of the coils due to frictional contact between the incoming terminal and the coils in the winding space which scrapes off the insulating layer of the conductor wire. Preferably, the two outgoing terminals 90 may be soldered to the circuit board 82 and electrically connected such that the two windings 56 are connected in series. The two incoming terminals 88 of the two windings 56 may be powered by an external single-phase alternating current power supply. Preferably, as shown in FIG. 9, the two insulating winding brackets 80 are integrally formed and are arranged in the length direction to have a bar shape. After the two windings 56 are wound around the winding brackets 80, the bar-shaped two winding brackets 80 are bent to be parallel to each other. The two parallel winding brackets 80 are then attached around the two parallel branches 60 of the stator core 54. Preferably, the two incoming terminals of the two windings 56 are disposed at two distal ends of the bar-shaped two winding brackets 80 away from each other or disposed at two adjacent ends of the bar-shaped two winding brackets 80 at a central portion thereof, and the winding direction of the two windings are opposite to each other. As such, once the two winding brackets are bent to be parallel to each other, the two incoming terminals of the two windings are disposed at the same ends, and the magnetic fields generated by the two windings connected in series do not cancel out each other.

Figure 10:
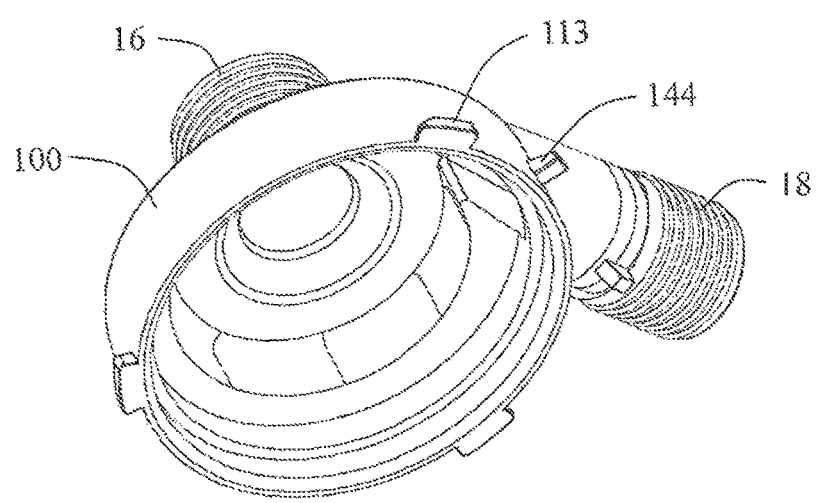
FIG. 10 illustrates a pump housing cover body of the pump of FIG. 1.
Figure 11:
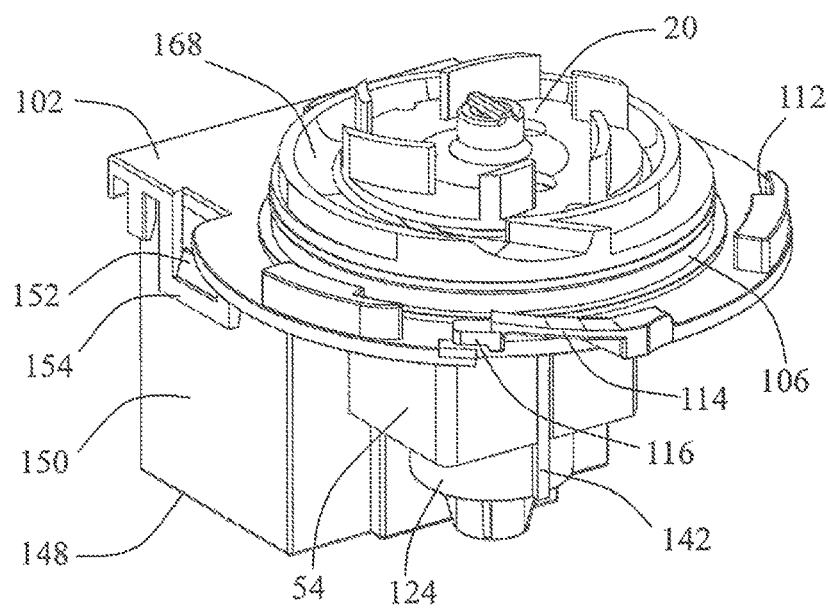
FIG. 11 is a view of the pump of FIG. 1 with the pump housing cover body removed.
Figure 12:
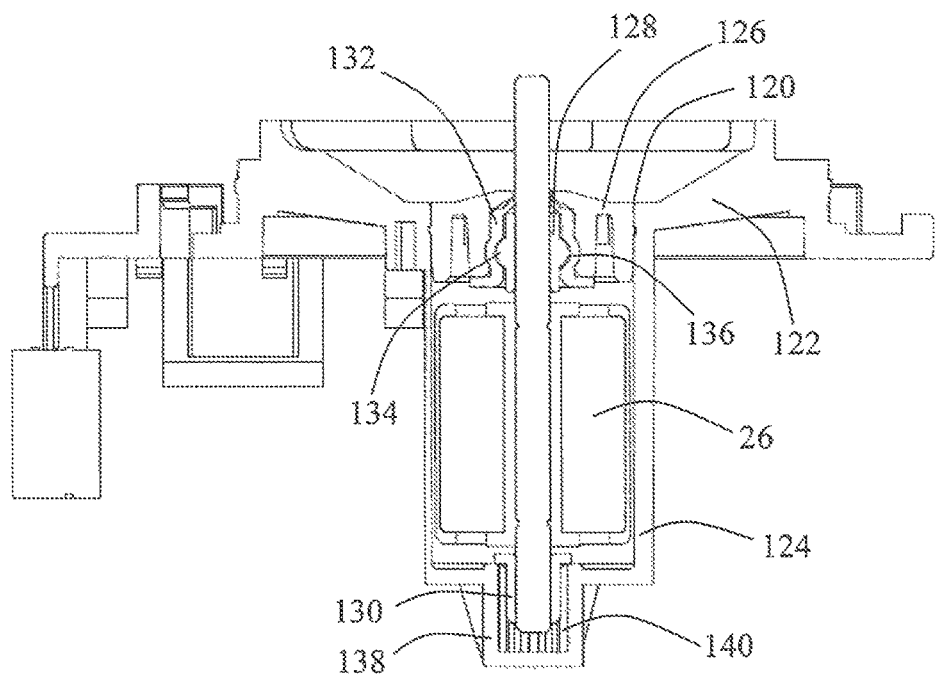
FIG. 12 illustrates mounting structures of the motor rotor of the pump of FIG. 1.

Referring to FIG. 10 through FIG. 12, the pump housing 14 includes a cover body 100, a bottom plate 102 mounted to the cover body 100. The cover body 100 is hermetically connected to the bottom plate 102 by a sealing ring 104. Preferably, the sealing ring 104 is positioned in a radial groove 106 of the bottom plate 102 to prevent the sealing ring 104 from becoming disengaged from the bottom plate 102 before the cover body 100 is mounted to the bottom plate 102. The cover body 100 includes a top plate 108, and a side enclosing plate 110 interconnecting the top plate 108 and the bottom plate 102. The inlet 16 extends generally axially outwardly from the top plate 108, and the outlet 18 extends from the side enclosing plate 110 in a direction generally perpendicular to the axial direction. The cover body 100 and the bottom plate 102 form the pump chamber 12 therebetween, and the impeller 20 is rotatably disposed in the pump chamber 12.

Snap locking structures are formed between the cover body 100 and the bottom plate 102. The snap locking structures may be snappingly locked with each other by relative circumferential rotation between the bottom plate 102 and the cover body 100. Preferably, a plurality of circumferentially-extending locking slots 112 is formed at an outer circumferential edge of the bottom plate 102, and a plurality of circumferentially-extending protrusions 113 is correspondingly formed on an outer surface of the cover body 100. An axial width of the circumferentially-extending protrusions 113 gradually decreases in a direction of inserting into the circumferentially-extending locking slots 112. A resilient arm 114 is formed at the outer circumferential edge of the bottom plate 102, which extends obliquely upwardly. The resilient arm has a free end with a step 116 recessed downwardly with respect to a body of the arm. A block 118 is formed on the outer surface of the cover body 100. When the cover body 100 is rotated in a clockwise direction, the circumferentially-extending protrusions 113 of the cover body 100 are inserted into their respective circumferentially-extending locking slots 112 of the bottom plate 102, and the block 118 slides over the resilient arm 114. Once the circumferentially-extending protrusions 113 are rotated to form interference-fit with their respective locking slots 112, the block 118 just slides to the step 116 which prevents reverse rotation of the cover body 100.

The bottom plate 102 includes a pump chamber bottom wall 122 having an opening 120, and a rotor housing 124 extending integrally axially and outwardly from the opening 120. A fixed end cap 126 is mounted to one end of the rotor housing 124 adjacent the opening 120. One end of the rotary shaft 28 passes the end cap 126 and enters the pump chamber 12 to connect to the impeller 20 for driving the impeller 20 to rotate. Opposite ends of the rotary shaft 28 may be respectively supported by a bearing 128 disposed in the end cap 126 and a bearing 130 disposed at another end of the rotor housing 124 away from the opening 120.

Preferably, the bearing 128 may be mounted to the end cap 126 via a shock absorber 132. The bearing 128 is cylindrical in shape and includes a ridge 134 extending circumferentially on an outer surface of the bearing 128. An inner surface of the shock absorber 132 forms a groove 136 for engaging with the ridge 134. This construction can ensure the concentricity between the bearing 128 and the rotor. The bearing 130 may be supported by a bearing seat 138 integrally formed with the rotor housing 124. A plurality of internal teeth 140 is formed on an inner surface of the bearing seat 138, which leads to a non-continuous contact between the inner surface of the bearing seat 138 and the outer surface of the bearing 130. This configuration can reduce vibration generated by the motor during operation.

The rotor housing 124 is fixed between two stator poles 62. A gap is formed between the outer surface of the rotor 26 and the rotor housing 124, such that the rotor 26 can rotate relative to the rotor housing 124. An axially-extending rib 142 (shown in FIG. 11) is formed on the outer surface of the rotor housing 124. Two adjacent sides of the two insulating winding brackets 80 at the ends adjacent the stator poles 62 cooperatively form a rib 144 (FIG. 6). The rib 142 and the rib 144 are respectively inserted into the two open slots 75 between the circumferential end portions 74 of the two poles 62, thus limiting relative circumferential rotation of the stator core 54. Preferably, an outer surface of the rib 142 of the rotor housing 124 is not higher than the side surface 65 of the stator pole 62 away from the bottom 58.

Figure 13:
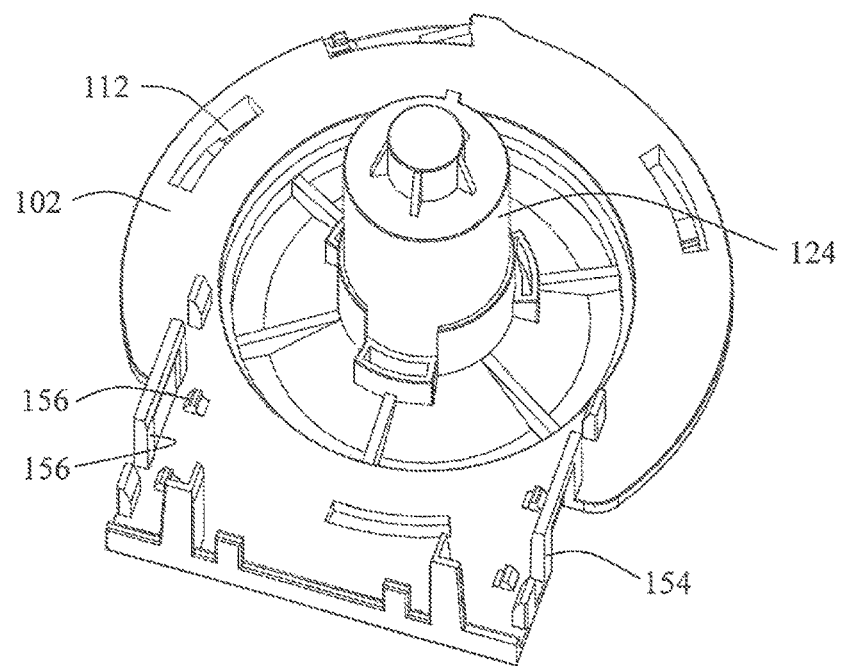
FIG. 13 is a bottom view of a bottom plate of the pump of FIG. 1.

Referring to FIG. 11 and FIG. 13, the motor further includes a motor cover body 146 covering the stator windings 56 and the circuit board 82. The motor cover body 146 includes a bottom wall 148 and two sidewalls 150 extending from the bottom wall 148. The two sidewalls 150 are disposed at two sides of the stator core 54. The circuit board 82 is disposed between the bottom wall 148 and the stator windings 56.

In the present embodiment, the motor cover body 146 and the pump housing 14 are mounted to each other by snap locking structures including protruding blocks 152 on the sidewalls 150 and hooks 154 extending downwardly from the bottom plate 102. The protruding blocks 152 are snappingly engaged with the hooks 154. The bottom plate 102 includes at least one pair of positioning protrusions 156 corresponding to the two sidewalls 150. Each of the sidewalls 150 is sandwiched between a corresponding one of the hooks 154 and a corresponding one of the positioning protrusions 156. Preferably, each positioning protrusion 156 is aligned with a void portion of the corresponding hook 154, such that the corresponding sidewall 150 can be pressed by the positioning protrusion 156 to deform toward the void portion. As such, the mounting force between the motor cover body 146 and the pump housing 14 is strengthened, which reduces vibration during operation of the motor.

In the present embodiment, the hooks 154 can also function as the positioning protrusions 156 at the same time. Understandably, the pair of positioning protrusions 156 may also be separately disposed independently of the hooks 154. In the illustrated embodiment, more than one pair of positioning protrusions 156 are formed at each sidewall. Alternatively, a single pair of positioning protrusions 156 may be formed at each side. In the case of more than one pair of positioning protrusions 156, each pair of positioning protrusions 156 may be separately disposed independently of the other pair of positioning protrusions 156. Alternatively, a bar-shaped protrusion 156 is formed in a location corresponding to an inside or outside of the sidewall, and two or more than two pairs of positioning protrusions 156 share the bar-shaped protrusion 156.

Chinese Patent Application Numbers 201410404474.2 and 201410404755.8 are incorporated by reference herein in its entirety. The motor of the present embodiment, when used in conjunction with the drive circuit disclosed in either of the Chinese patent applications or another suitable drive circuit, can ensure that the rotor rotates in the same direction during each startup. As such, in applications such as fans or water pumps, the impeller driven by the rotor may utilize curved blades thus enhancing the hydraulic efficiency of the fans or water pumps. Thus, smaller motors can be used for achieving the same level of output, which can reduce energy consumption. The drive circuit may be disposed on the circuit board 82. Based on magnetic pole position information detected by a position sensor 158 (FIG. 2), the stator windings 56 are energized in a predetermined manner to ensure that the rotor has the fixed startup direction each time the motor is powered. In the present embodiment, the position sensor 158 is disposed in a range of a cute angle formed between a perpendicular line of the pole axis S1 of the rotor when the rotor is stationary and a perpendicular line of the center axis S2 of the stator. The position sensor 158 is disposed outside the rotor housing 124 and covered by the motor cover body 146.

Figure 14:
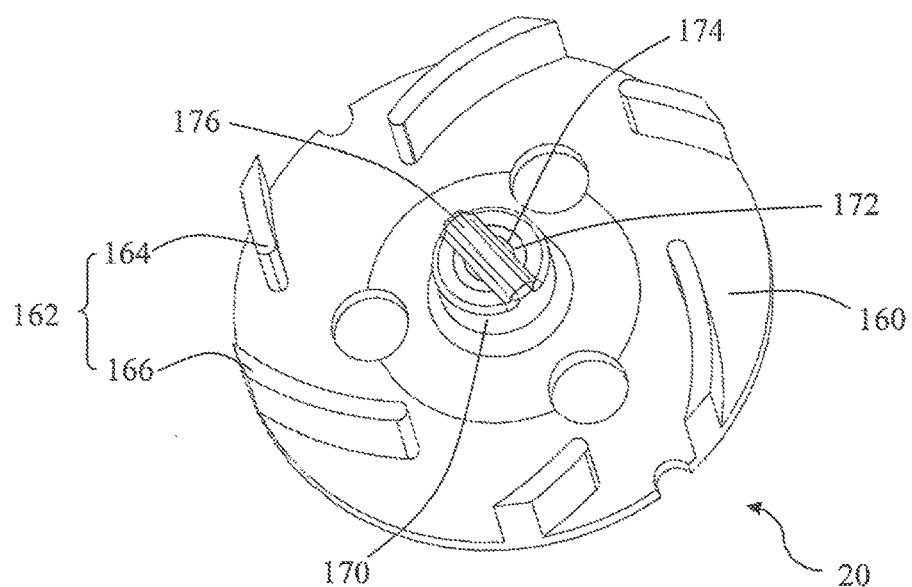
FIG. 14 illustrates an impeller of the pump of FIG. 1.

Referring to FIG. 14, the impeller 20 is fixedly mounted to the rotary shaft 28 for synchronous rotation with the rotary shaft 28. The impeller 20 may be made from plastic material and includes a substrate 160 and a plurality of blades 162 spacedly mounted to the substrate 160 in the circumferential direction. Preferably, the blades 162 of the impeller 20 are arc shaped and include a group of long blades 164 and a group of short blades 166. The two groups of blades are alternatively disposed at the outer circumferential edge of the substrate 160 in the circumferential direction. A spiral flow passage 168 (FIG. 11) is formed between an inner surface of the pump chamber 12 and the impeller 20. A radial cross-sectional area of the flow passage 168 gradually increases in the circumferential direction toward the outlet 18. Under the condition that the rotor has the fixed startup rotating direction, the arc-shaped blades and the spiral flow passage can enhance the hydraulic efficiency. A mounting post 170 is disposed at a central area of the substrate 160. One end of the rotary shaft 28 is fixed to the mounting post 170 via a shaft sleeve 172. The shaft sleeve 172 may be formed from a metal material. Preferably, at an axial end of the mounting post 170 away from the motor, the mounting post 170, the shaft sleeve 172 and an injection molding portion 174, which are arranged radially inwardly, cooperatively form a continuous closed end surface. The injection molding portion 174 and the mounting post 170 are connected via a bridging portion 176. In an alternative embodiment, the impeller 20 may utilize straight type blades.

Figure 15:
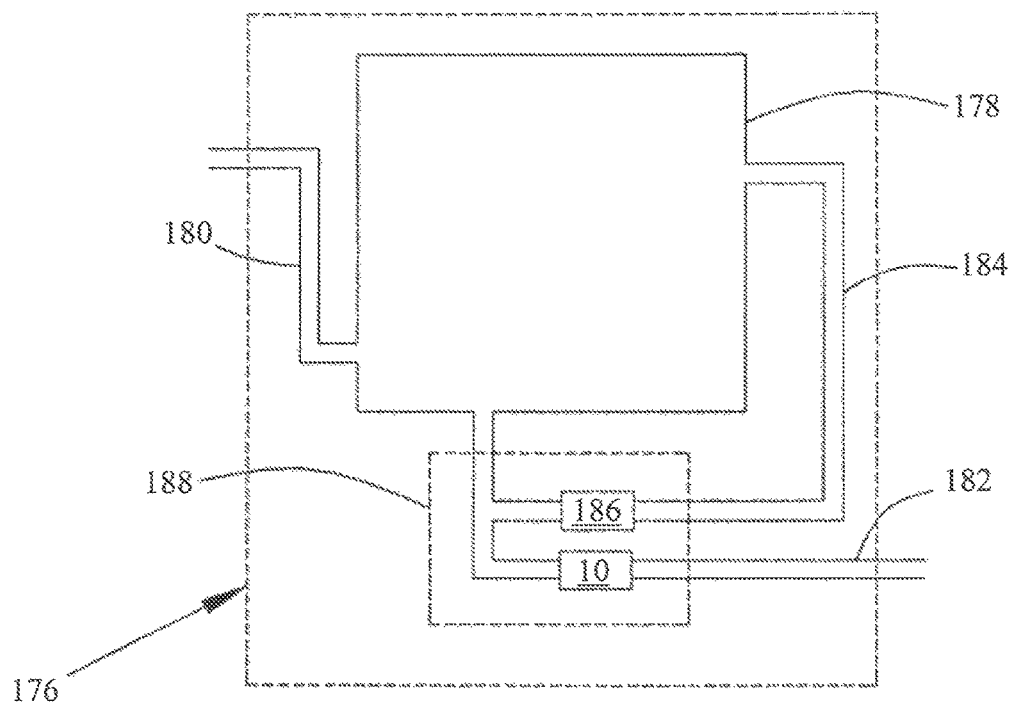
FIG. 15 illustrates a dishwasher employing the pump according to one embodiment of the present invention.

The pump 10 described herein is particularly suitable for use as a drain pump for cleaning apparatus such as dishwashers or laundry machines but not limited to it. FIG. 15 illustrates a dishwasher 176 comprising a drain pump according to one embodiment of the present invention. The dishwasher includes a cleaning chamber 178, a water supply passage 180 for supplying cleaning water to the cleaning chamber 178, a drain passage 182 for drainage of water, a circulating passage 184 for circulating cleaning water in the cleaning chamber 178, and a control system 188 having a drain pump 10 and a circulating pump 186. The drain pump 10 pumps the cleaning water in the cleaning chamber 178 to the drain passage 182, and the circulating pump 186 pumps the cleaning water in the cleaning chamber 178 to the circulating passage 184. It should be understandable that the motor described in embodiments of the present invention can also be used in other applications.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A synchronous motor comprising a stator and a permanent magnetic rotor rotatable relative to the stator, wherein the rotor comprises a rotary shaft and two magnets fixed to the rotary shaft, each magnet covers a half of the circumference of the rotary shaft along a circumferential direction and comprises a radial outer surface, a radial inner surface, and two connecting surfaces that connect the radial outer surface and the radial inner surface at opposite ends of the magnet, the radial outer surface has an arc section, the radial inner surfaces of the two magnets cooperatively form an annular surface which defines an inner bore for the rotary shaft to pass therethrough; the stator comprises a stator core and stator windings wound around the stator core the stator core comprises a pair of opposing poles and a yoke connected between the poles, each pole has a pole arc surface facing the rotor, with an air gap formed between the pole arc surface and the rotor, a ratio of a pole arc angle of each magnet to a 180-degree angle is in the range of 0.75 to 0.94, wherein the pole arc angle of each magnet is an angle formed by hypothetical lines connecting two circumferential ends of the arc section of the radial outer section of the magnet and a central axis of the rotary shaft, and wherein the connecting surfaces of one of the magnets contact the connecting surfaces of the other one of the magnets, the radial outer surface of each magnet further includes two plane sections extending respectively from the two circumferential ends of the arc section to the connecting surfaces, two plane sections of the radial outer surfaces of the two magnets at a same circumferential end are coplanar.

2. The synchronous motor of claim 1, wherein the pair of poles of the stator core comprises opposing circumferential end portions spaced apart from each other.

3. The synchronous motor of claim 2, wherein a ratio of a distance between the opposing circumferential end portions of the pair of poles of the stator core to a minimum width of the air gap is less than 2.

4. The synchronous motor of claim 1, wherein the pole arc surface is concentric with the rotor such that a uniform main air gap is formed between the pole arc surface and the rotor, an inward-recessed startup groove is formed in the pole arc surface, and the startup groove and the rotor form a non-uniform air gap therebetween.

5. The synchronous motor of claim 1, wherein the two permanent magnets are fixed to the rotary shaft by an over-molding piece, an outer surface of the over-molding piece is concentric with the rotary shaft, the two connecting surfaces of each magnet are coplanar, and a ratio of a distance between two outer ends of the two connecting surfaces to a diameter of the outer surface of the over-molding piece is in the range of 0.82 to 0.95.

6. A rotor comprising a rotary shaft and two magnets fixed to the rotary shaft, each magnet covering a half of the circumference of the rotary shaft along a circumferential direction and comprising a radial outer surface, a radial inner surface, and two connecting surfaces that connect the radial outer surface and the radial inner surface at opposite ends of the magnet, the radial outer surface has an arc section, the radial inner surfaces of the two magnets cooperatively form an annular surface which defines an inner bore for the rotary shaft to pass therethrough, and a ratio of a pole arc angle of each magnet to a 180-degree angle is in the range of 0.75 to 0.94, wherein the pole arc angle of each magnet is an angle formed by hypothetical lines connecting two circumferential ends of the arc section of the radial outer section of the magnet and a central axis of the rotary shaft, wherein the connecting surfaces of one of the magnets contact the connecting surfaces of the other one of the magnets, the radial outer surface of each magnet further includes two plane sections extending respectively from the two circumferential ends of the arc section to the connecting surfaces, two plane sections of the radial outer surfaces of the two magnets at a same circumferential end are coplanar.

7. The rotor of claim 6, wherein a ratio of a pole arc angle of each magnet to a 180-degree angle is in the range of 0.9 to 0.94.

8. The rotor of claim 6, wherein the two magnets are fixed to the rotary shaft by an over-molding piece, an outer surface of the over-molding piece is concentric with the rotary shaft, the two connecting surfaces of each magnet are coplanar, and a ratio of a distance between two outer ends of the two connecting surfaces to a diameter of the outer surface of the over-molding piece is in the range of 0.82 to 0.95.

9. The rotor of claim 6, wherein a distance between the two circumferential ends at opposite ends of the two plane sections at a same side is in the range of 2 mm to 2.5 mm.

10. The rotor of claim 6, wherein the two magnets are fixed to the rotary shaft by an over-molding piece, an axial end of the over-molding piece defines two spaced positioning grooves respectively aligning with two junctions of the two magnets, with axial ends of the two plane sections at the same side of the two magnets completely exposed from the corresponding positioning groove.

11. A motor comprising a stator and a rotor in accordance with claim 6.

12. A pump comprising:
a pump housing having a pump chamber;
an inlet and an outlet in communication with the pump chamber;
an impeller rotatably disposed in the pump chamber; and
a motor for driving the impeller, wherein the motor comprises a stator and a rotor in accordance with claim 6.

13. A cleaning apparatus comprising a cleaning chamber, a water supply passage for supplying cleaning water to the cleaning chamber, a drain passage for drainage of water, and a drain pump for pumping the cleaning water in the cleaning chamber to the drain passage, wherein the drain pump comprises the features of the pump in accordance with claim 12.

14. The rotor of claim 6, wherein a distance between two circumferential ends at opposite ends of the two plane sections at a same side is in the range of 2 mm to 9.5 mm.

15. The synchronous motor of claim 1, wherein a distance between two circumferential ends at opposite ends of the two plane sections at a same side is in the range of 2 mm to 9.5 mm.

16. The rotor of claim 1, wherein the two magnets are fixed to the rotary shaft by an overmolding piece, an axial end of the over-molding piece defines two spaced positioning grooves respectively aligning with two junctions of the two magnets, with axial ends of the two plane sections at the same side of the two magnets completely exposed from the corresponding positioning groove.

* * * * *